US008988906B2

(12) United States Patent
Figueroa et al.

(10) Patent No.: US 8,988,906 B2
(45) Date of Patent: Mar. 24, 2015

(54) POWER CONVERSION APPARATUS

(71) Applicant: Toshiba Mitsubishi-Electric Industrial Systems Corporation, Tokyo (JP)

(72) Inventors: Ruben Alexis Inzunza Figueroa, Tokyo (JP); Eiichi Ikawa, Tokyo (JP); Takeshi Sumiya, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 0 days.

(21) Appl. No.: 13/973,591

(22) Filed: Aug. 22, 2013

(65) Prior Publication Data
US 2013/0336025 A1   Dec. 19, 2013

Related U.S. Application Data

(63) Continuation of application No. PCT/JP2011/053957, filed on Feb. 23, 2011.

(51) Int. Cl.
| | | |
|---|---|---|
| *H02M 5/45* | (2006.01) | |
| *H02M 7/5395* | (2006.01) | |
| *H02J 3/38* | (2006.01) | |
| *H02M 7/5387* | (2007.01) | |
| *H02M 5/458* | (2006.01) | |

(52) U.S. Cl.
CPC ............. *H02M 7/5395* (2013.01); *H02J 3/386* (2013.01); *H02M 7/53871* (2013.01); *H02M 5/4585* (2013.01); *Y02E 10/763* (2013.01)
USPC .............................................. 363/37; 363/97

(58) Field of Classification Search
USPC ......... 363/34, 35, 36, 37, 40, 41, 95, 97, 120, 363/121
See application file for complete search history.

(56) References Cited

U.S. PATENT DOCUMENTS

| | | | |
|---|---|---|---|
| 5,535,113 A | * | 7/1996 | Konishi .......................... 363/35 |
| 6,921,985 B2 | | 7/2005 | Janssen et al. |
| 2004/0170038 A1 | * | 9/2004 | Ichinose et al. ................. 363/95 |
| 2011/0120760 A1 | * | 5/2011 | Okada et al. ................... 174/257 |

FOREIGN PATENT DOCUMENTS

| | | |
|---|---|---|
| JP | 08-179840 | 7/1996 |
| JP | 08-237952 | 9/1996 |
| JP | 2008-228494 | 9/2008 |

OTHER PUBLICATIONS

English-language International Search Report from Japanese Patent Office for International Application No. PCT/JP2011/053957, mailed May 17, 2011.
International Preliminary Report on Patentability and Written Opinion issued by The International Bureau of WIPO on Aug. 27, 2013.

\* cited by examiner

*Primary Examiner* — Nguyen Tran
(74) *Attorney, Agent, or Firm* — Finnegan, Henderson, Farabow, Garrett & Dunner, LLP

(57) ABSTRACT

A power conversion apparatus includes an inverter circuit, a system voltage measurement unit measuring a system voltage, a voltage drop detector detecting a voltage drop of a power system, based on the system voltage, a direct current power measurement unit measuring a direct current power to be input into the inverter circuit, an alternating current command value calculator calculating an alternating current command value to control an alternating current output from the inverter circuit, based on the direct current power and the system voltage, and a current limiter that decrease a current limit value to limit the alternating current command value, when the voltage drop is detected.

15 Claims, 4 Drawing Sheets

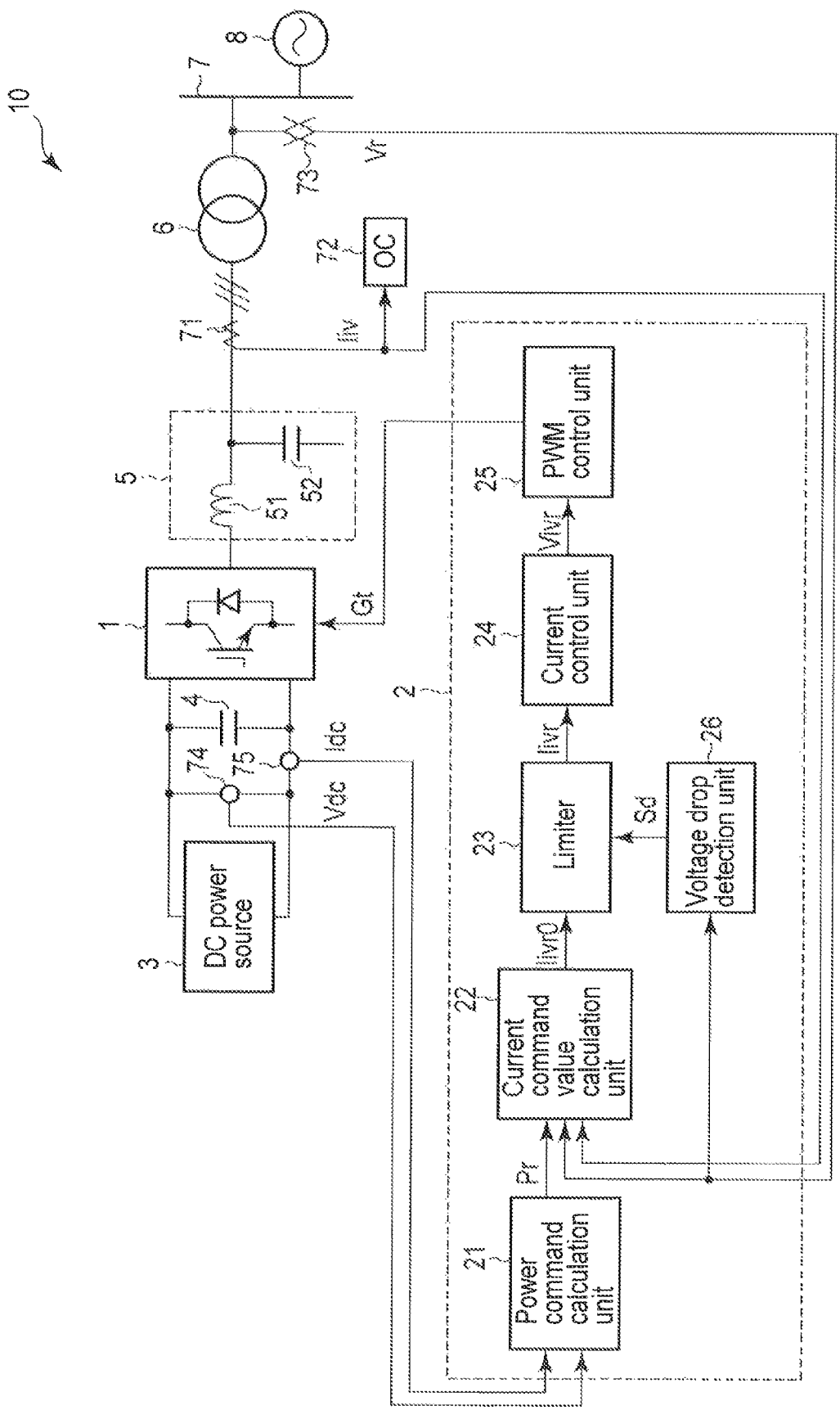
F I G. 1

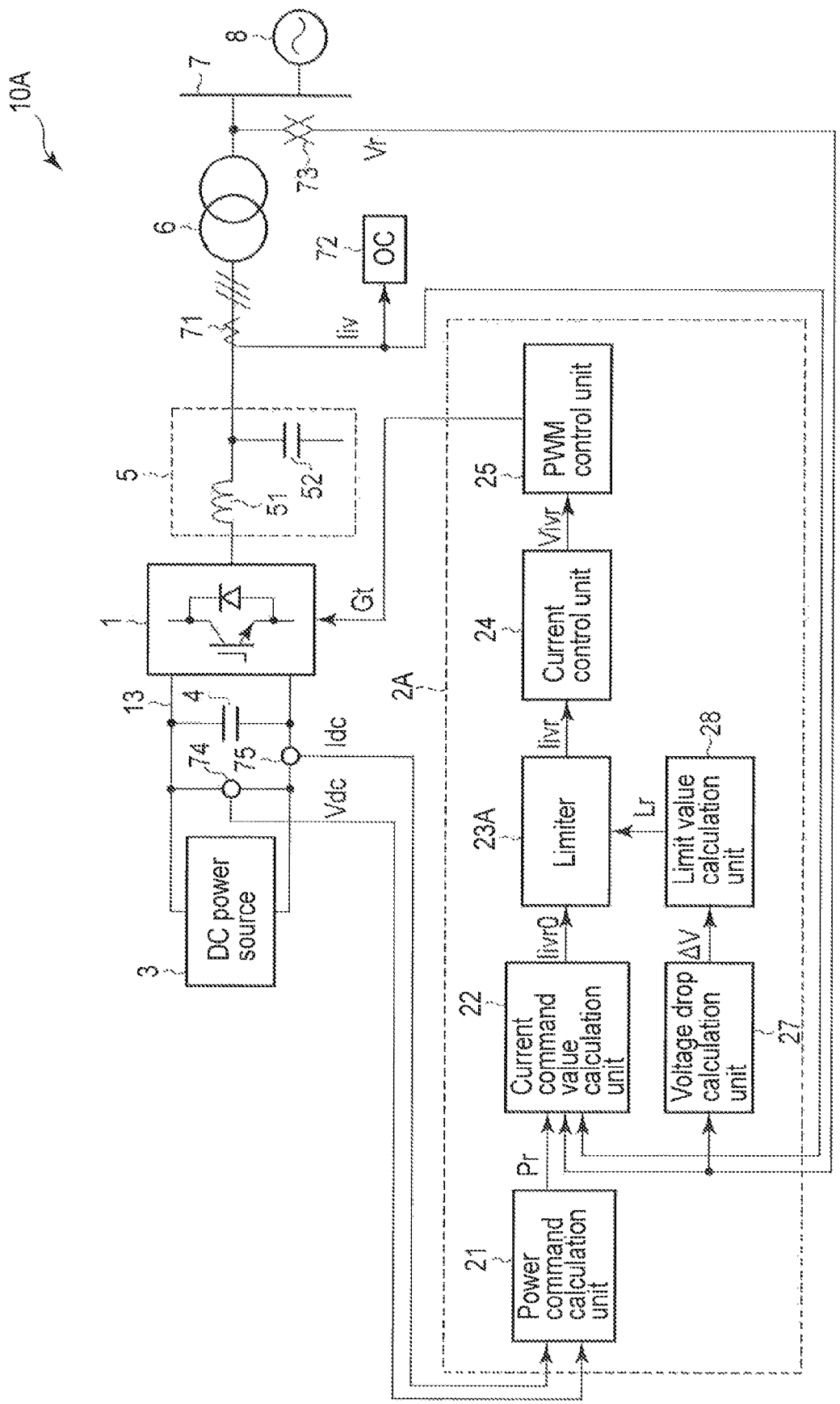
F I G. 2

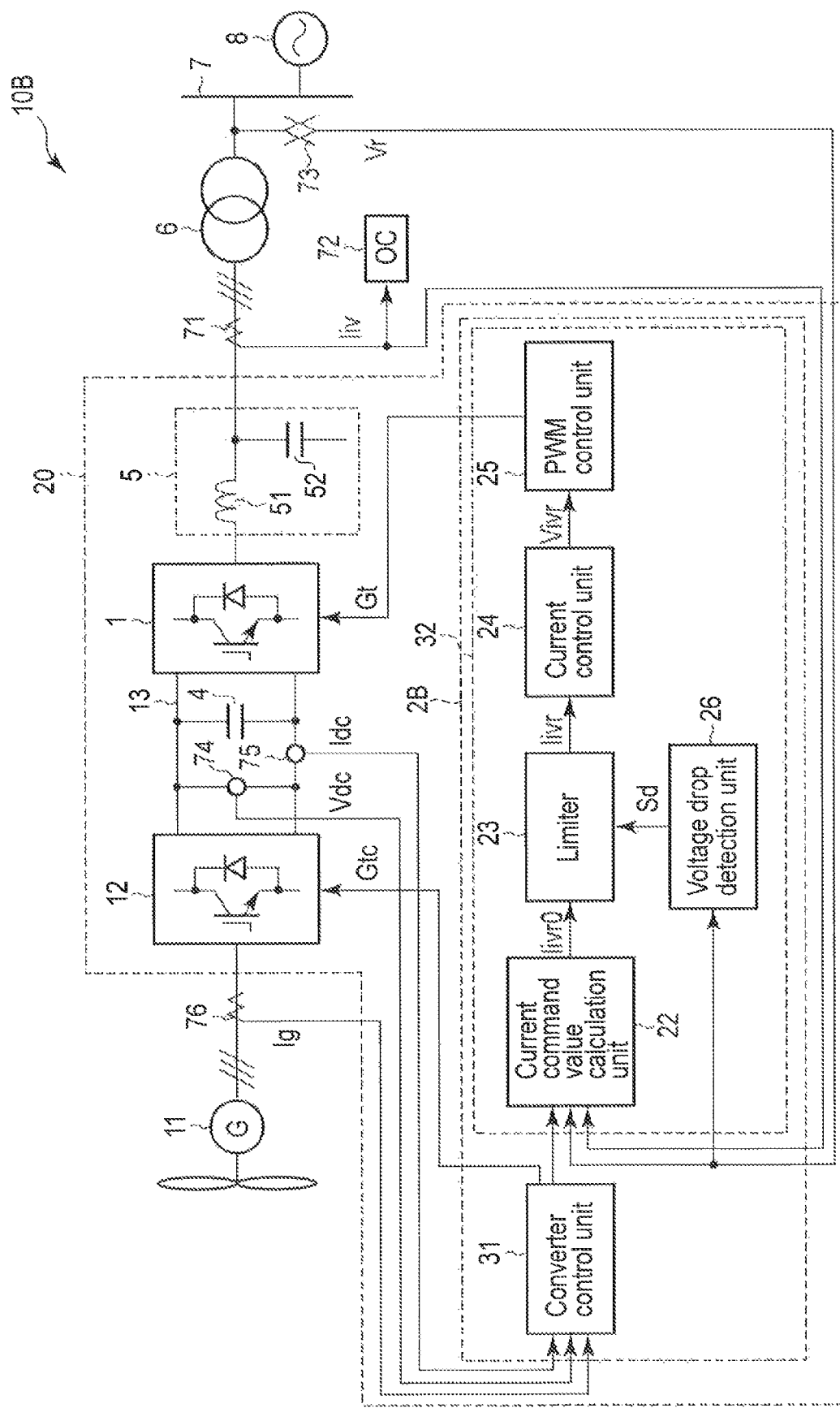
F I G. 3

POWER CONVERSION APPARATUS

CROSS REFERENCE TO RELATED APPLICATIONS

This application is a Continuation application of PCT Application No. PCT/JP2001/053957, filed Feb. 23, 2011, the entire contents of which are incorporated herein by reference.

BACKGROUND OF THE INVENTION

1. Field of the Invention

The invention relates to a power conversion apparatus to be applied to a generation system which interconnects with an alternating current power system.

2. Description of the Related Art

In general, a power conversion apparatus is used in a generation system which interconnects with an alternating current (AC) power system. The power conversion apparatus converts a direct current (DC) power into an AC power which synchronizes with the AC power system, to supply the power to the AC power system. Moreover, on an AC output side of the power conversion apparatus, an overcurrent relay is disposed to protect the power conversion apparatus.

However, the overcurrent relay for use in this way performs the following false operation sometimes. When a system voltage drops owing to a fault or the like of the AC power system, an amplitude of a ripple of an alternating current output from the power conversion apparatus increases. In consequence, even when an instantaneous value of a current of a fundamental component is not in excess of a setting value at which the overcurrent relay operates, the instantaneous value due to the amplitude of the ripple of the current exceeds the setting value, so that the overcurrent relay operates sometimes. In this case, the overcurrent relay is to bring about the false operation.

CITATION LIST

Patent Literature

Patent Literature 1: U.S. Pat. No. 6,921,985

BRIEF SUMMARY OF THE INVENTION

An object of the invention is to provide a power conversion apparatus to be applied to a generation system which interconnects with an AC power system, so that a false operation of an overcurrent relay disposed on an AC output side can be prevented.

In accordance with an aspect of the invention, there is provided a power conversion apparatus to be applied to a generation system that interconnects with an alternating current power system. The power conversion apparatus includes an inverter circuit configured to convert a direct current power into an alternating current power; a system voltage measurement unit configured to measure a system voltage of the alternating current power system; a voltage drop detector configured to detect a voltage drop of the alternating current power system, based on the system voltage measured by the system voltage measurement unit; a direct current power measurement unit configured to measure a direct current power to be input into the inverter circuit; an alternating current command value calculator configured to calculate an alternating current command value to control an alternating current output from the inverter circuit, based on the direct current power measured by the direct current power measurement unit and the system voltage measured by the system voltage measurement unit; and a current limiter configured to decrease a current limit value to limit the alternating current command value calculated by the alternating current command value calculator, when the voltage drop is detected by the voltage drop detector.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a constitution of a dispersed generation system to which a control apparatus of an inverter according to a first embodiment of the invention is applied;

FIG. 2 is a block diagram showing a constitution of a dispersed generation system to which a control apparatus of an inverter according to a second embodiment of the invention is applied;

FIG. 3 is a block diagram showing a constitution of a dispersed generation system to which a power conditioner of a wind power generation system according to a third embodiment of the invention is applied.

DETAILED DESCRIPTION OF THE INVENTION

Figure 4:
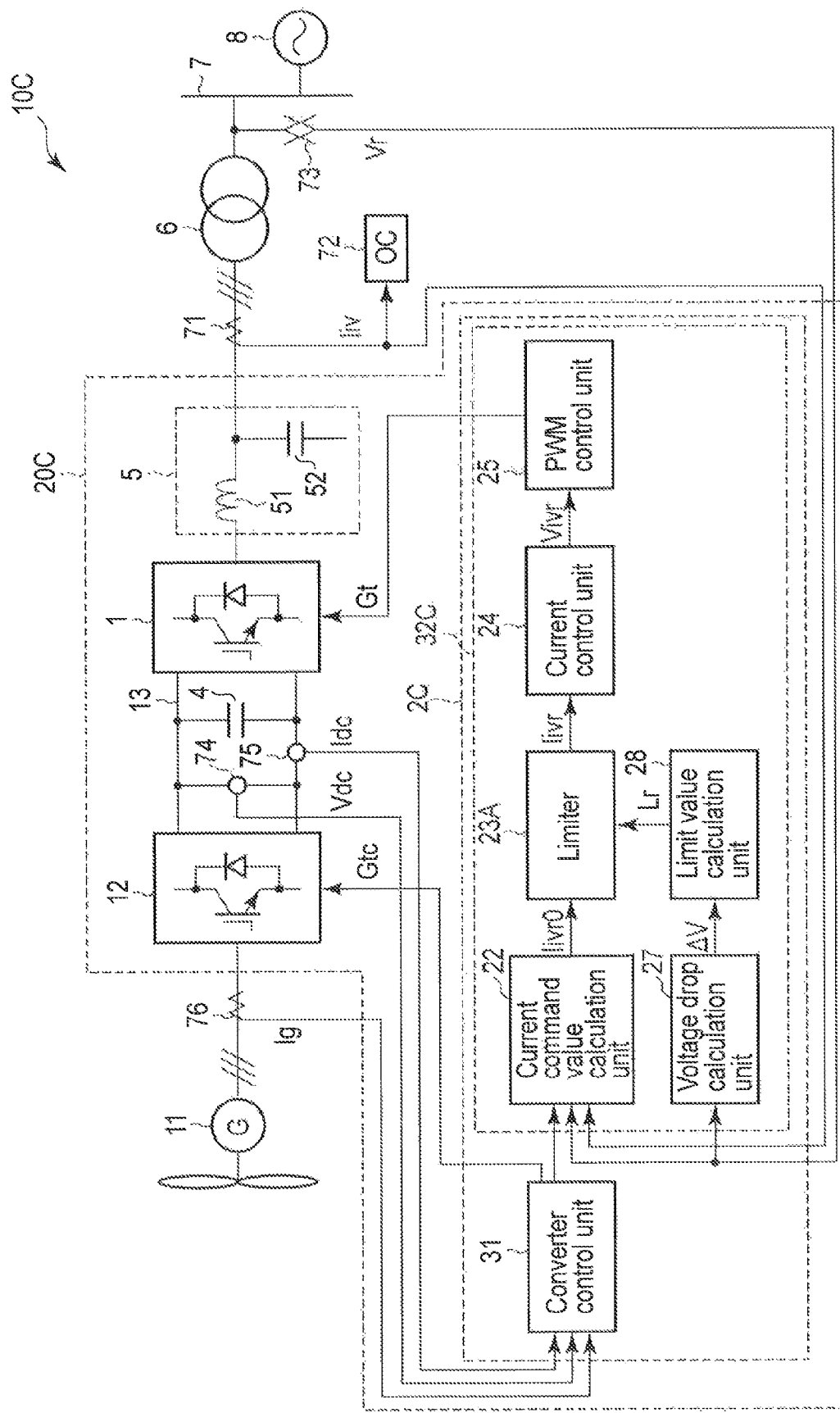
FIG. 4 is a block diagram showing a constitution of a dispersed generation system to which a power conditioner of a wind power generation system according to a fourth embodiment of the invention is applied.

Hereinafter, embodiments of the invention will be described with reference to the drawings.

First Embodiment

FIG. 1 is a block diagram showing a constitution of a dispersed generation system 10 to which a control apparatus 2 of an inverter 1 according to a first embodiment of the invention is applied. It is to be noted that the same parts as in the drawings are denoted with like reference signs to omit detailed description of the parts, and different parts will mainly be described. Also in the subsequent embodiments, repeated descriptions are similarly omitted.

The dispersed generation system 10 comprises the inverter 1, the control apparatus 2, a DC power source 3, a smoothing capacitor 4, an AC filter 5, an interconnection transformer 6, an AC current detector 71, an overcurrent relay 72, an AC voltage detector 73, and a DC voltage detector 74. The dispersed generation system 10 is a generation system which interconnects with an AC power system including a system bus 7 and an AC power source 8.

The DC power source 3 supplies a DC power to the inverter 1. The DC power source 3 is, for example, a secondary cell, a solar cell, or a fuel cell.

The inverter 1 is an inverter subjected to pulse width modulation (PWM) control. The inverter 1 converts the DC power supplied from the DC power source 3 into the AC power which synchronizes with the AC power source 8. The inverter 1 supplies the AC power to the system bus 7 connected to the AC power source 8, via the interconnection transformer 6. In the inverter 1, a power conversion circuit (an inverter circuit) is constituted of a switching element. The switching element is driven by a gate signal Gt output from the control apparatus 2. In consequence, the inverter 1 performs the power conversion.

The smoothing capacitor 4 is disposed on a DC side of the inverter 1. The smoothing capacitor 4 smoothes the DC power supplied from the DC power source 3 to the inverter 1.

The AC filter 5 comprises a reactor 51 and a capacitor 52. The AC filter 5 removes a noise output from the inverter 1.

The AC current detector 71 is a detector to measure an output current Iiv of the inverter 1. The AC current detector 71 outputs the detected output current Iiv as a detection signal to the control apparatus 2 and the overcurrent relay 72.

The overcurrent relay 72 performs a protecting operation, when an instantaneous value of the output current Iiv measured by the AC current detector 71 is in excess of a beforehand setting value.

The AC voltage detector 73 is a detector to measure a system voltage Vr of the system bus 7. The AC voltage detector 73 outputs the detected system voltage Vr as a detection signal to the control apparatus 2.

The DC voltage detector 74 is a detector to measure a DC voltage Vdc which is to be applied to the DC side of the inverter 1. The DC voltage detector 74 outputs the detected DC voltage Vdc as a detection signal to the control apparatus 2.

A DC current detector 75 is a detector to measure a direct current Idc which is to be input into the DC side of the inverter 1. The DC current detector 75 outputs a detected direct current Idc as a detection signal to the control apparatus 2.

The control apparatus 2 comprises a power command calculation unit 21, a current command value calculation unit 22, a limiter 23, a current control unit 24, a PWM control unit 25, and a voltage drop detection unit 26.

The power command calculation unit 21 calculates a power command value Pr on the basis of the DC voltage Vdc detected by the DC voltage detector 74, and the direct current Idc detected by the DC current detector 75. The power command value Pr is a command value to an output power of the inverter 1. The power command calculation unit 21 outputs the calculated power command value Pr to the current command calculation unit 22.

Into the current command calculation unit 22, there are input the power command value Pr calculated by the power command calculation unit 21, the output current Iiv detected by the AC current detector 71 and the system voltage Vr detected by the AC voltage detector 73. The current command value calculation unit 22 calculates a current command value Iivr0 to control the output current Iiv so that the output power of the inverter 1 follows the power command value Pr. The current command calculation unit 22 outputs the calculated current command value Iivr0 to the limiter 23.

Into the voltage drop detection unit 26, the system voltage Vr detected by the AC voltage detector 73 is input. The voltage drop detection unit 26 outputs a detection signal Sd to the limiter 23 on the basis of the system voltage Vr. The voltage drop detection unit 26 sets the detection signal Sd to "0", when the system voltage Vr is not less than a predetermined reference voltage (usual time). The voltage drop detection unit 26 sets the detection signal Sd to "1", when the system voltage Vr is below the predetermined reference voltage (at the drop of the system voltage Vr).

Into the limiter 23, the current command value Iivr0 calculated by the current command calculation unit 22 is input. The limiter 23 limits the current command value Iivr0 by a limit value. The limiter 23 outputs the limited current command value Iivr0 to the current control unit 24.

In the limiter 23, two limit values are set. The limiter 23 switches the limit value in accordance with the detection signal Sd input from the voltage drop detection unit 26. At the usual time (when the detection signal Sd is "0"), the limiter 23 limits the current command value Iivr0 by use of a maximum current value in an allowable range of the output current of the inverter 1 as the limit value. At the drop of the system voltage (when the detection signal Sd is "1"), the limiter 23 limits the current command value Iivr0 by the limit value smaller than that at the usual time.

Next, a way to obtain the limit value for use at the drop of the system voltage Vr will be described.

A current ripple to be superimposed on the output current Iiv of the inverter 1 is generated in accordance with the following equation.

$$di/dt = \Delta V/L \qquad (1)$$

in which the left side is a change ratio of the output current Iiv of the inverter 1. L is a reactor component between the inverter 1 and the system bus 7. $\Delta V$ is a voltage drop of the system voltage Vr.

The limit value is set so that the current ripple predicted in accordance with the above equation is suppressed.

Into the current control unit 24, there are input the output current Iiv detected by the AC current detector 71 and a current command value Iivr limited by the limiter 23. The current control unit 24 calculates a voltage command value Vivr to control an output voltage so that the output current Iiv of the inverter 1 follows the current command value Iivr. The current control unit 24 outputs the calculated voltage command value Vivr to the PWM control unit 25.

Into the PWM control unit 25, the voltage command value Vivr calculated by the current control unit 24 is input. The PWM control unit 25 generates a gate signal Gt so that the output voltage of the inverter 1 is controlled to the voltage command value Vivr. The gate signal Gt drives the switching element of the inverter 1. In consequence, the inverter 1 is subjected to PWM control.

According to the present embodiment, when the voltage drop is detected by the voltage drop detection unit 26 and the limit value to limit the current command value Iivr0 is set to be smaller than that at the usual time, the output current Iiv of the inverter 1 can be decreased. In consequence, the ripple of the output current Iiv of the inverter 1 can be prevented from being in excess of the setting value of the overcurrent relay 72. In consequence, the false operation of the overcurrent relay 72 can be prevented.

The control apparatus 2 controls the inverter 1 to output the power command value Pr calculated by the power command calculation unit 21. Therefore, when the limit value to limit the current command value Iivr0 is decreased, the output voltage of the inverter 1 increases. The control to increase the output voltage of the inverter 1 at the drop of the voltage of the system bus 7 due to a system fault or the like is control opposite to usually performed control to decrease the output voltage of the inverter 1. However, the control apparatus 2 decreases the output current of the inverter 1 only at the voltage drop of the system voltage Vr, so that it is possible to prevent the false operation of the overcurrent relay 72 due to the ripple of the output current Iiv of the inverter 1.

Second Embodiment

FIG. 2 is a block diagram showing a constitution of a dispersed generation system 10A to which a control apparatus 2A of an inverter 1 according to a second embodiment of the invention is applied.

The dispersed generation system 10A has a constitution where in the dispersed generation system 10 according to the first embodiment shown in FIG. 1, the control apparatus 2 is replaced with the control apparatus 2A. The other respects are similar to those of the dispersed generation system 10 according to the first embodiment.

The control apparatus 2A has a constitution where in the control apparatus 2 according to the first embodiment, the limiter 23 is replaced with a limiter 23A and the voltage drop detection unit 26 is replaced with a voltage drop calculation unit 27 and a limit value calculation unit 28. The other aspects are similar to those of the control apparatus 2 according to the first embodiment.

Into the voltage drop calculation unit 27, a system voltage Vr detected by an AC voltage detector 73 is input. When the system voltage Vr is below a predetermined reference voltage (at the drop of the system voltage), the voltage drop calculation unit 27 calculates a voltage drop $\Delta V$ by subtracting the system voltage Vr from a rated voltage. The voltage drop calculation unit 27 outputs the calculated voltage drop $\Delta V$ to the limit value calculation unit 28.

Into the limit value calculation unit 28, the voltage drop $\Delta V$ calculated by the voltage drop calculation unit 27 is input. The limit value calculation unit 28 calculates a limit value Lr on the basis of the voltage drop $\Delta V$. The more voltage drop $\Delta V$, the less limit value Lr is calculated. The limit value calculation unit 28 outputs the calculated limit value Lr to the limiter 23A.

The limiter 23A limits the current command value Iivr0 by the limit value Lr calculated by the limit value calculation unit 28. The other aspects are similar to those of the limiter 23 according to the first embodiment.

According to the present embodiment, the limit value Lr to limit the current command value Iivr0 is changed in accordance with the voltage drop $\Delta V$, so that the output current Iiv can be limited by the minimum limit value Lr at which the overcurrent relay 72 is not operated. In consequence, as compared with the first embodiment, an output voltage of the inverter 1 can be prevented from being unnecessarily increased.

Third Embodiment

FIG. 3 is a block diagram showing a constitution of a dispersed generation system 10B to which a power conditioner 20 of a wind power generation system according to a third embodiment of the invention is applied.

The dispersed generation system 10B has a constitution where in the dispersed generation system 10 according to the first embodiment shown in FIG. 1, the control apparatus 2 is replaced with a control apparatus 2B, the DC power source 3 is replaced with a wind power generator 11 and a converter 12, and an AC current detector 76 is added. The power conditioner 20 comprises the inverter 1, the converter 12, the control apparatus 2B, the smoothing capacitor 4, and the AC filter 5. The other aspects are similar to those of the dispersed generation system 10 according to the first embodiment.

The wind power generator 11 is a generator to generate an AC power by use of wind power. The wind power generator 11 supplies the generated AC power to the power conditioner 20.

The power conditioner 20 is a power conversion apparatus to convert the AC power supplied from the wind power generator 11 into the AC power which synchronizes with the system voltage Vr. The power conditioner 20 supplies the converted AC power to the system bus 7 via the interconnection transformer 6.

A DC side of the converter 12 is connected to a DC side of the inverter 1 via a DC link 13. That is, the converter 12 and the inverter 1 constitute a back to back (BTB) converter. An AC side of the converter 12 is connected to the wind power generator 11. The converter 12 converts the AC power generated by the wind power generator 11 into a DC power, to supply the power to the inverter 1.

The converter 12 is an inverter subjected to PWM control. In the converter 12, a power conversion circuit is constituted of a switching element. The switching element is driven by a gate signal Gtc output from a converter control unit 31 of the control apparatus 2B. In consequence, the converter 12 performs the power conversion.

The control apparatus 23 has a constitution where in the control apparatus 2 according to the first embodiment, the converter control unit 31 is disposed in place of the power command value generation unit 21. An inverter control unit 32 is constituted of the current command value calculation unit 22, the limiter 23, the current control unit 24, the PWM control unit 25, and the voltage drop detection unit 26. The other aspects are similar to those of the control apparatus 2 according to the first embodiment.

The AC current detector 76 is a detector to measure an alternating current Ig which is to be input from the wind power generator 11 into the converter 12. The AC current detector 76 outputs the detected alternating current Ig as a detection signal to the converter control unit 31.

Into the converter control unit 31, there are input the alternating current Ig detected by the AC current detector 76, the DC voltage Vdc detected by the DC voltage detector 74, and the direct current Idc detected by the DC current detector 75.

The converter control unit 31 generates a gate signal Gtc to control the converter 12, on the basis of the alternating current Ig detected by the AC current detector 76, the DC voltage Vdc detected by the DC voltage detector 74, and the direct current Idc detected by the DC current detector 75. The converter control unit 31 outputs the generated gate signal Gtc, to drive the switching element of the converter 12.

The converter control unit 31 calculates the power command value Pr to control the inverter 1. The converter control unit 31 outputs the calculated power command value Pr to the current control unit 22.

According to the present embodiment, in the power conditioner 20 of the wind power generation system, a function and an effect similar to those of the first embodiment can be obtained.

Fourth Embodiment

FIG. 4 is a block diagram, showing a constitution of a dispersed generation system 10C to which a power conditioner 20C of a wind power generation system according to a fourth embodiment of the invention is applied.

The dispersed generation system 10C has a constitution where in the dispersed generation system 10B according to the third embodiment shown in FIG. 3, the power conditioner 20 is replaced with the power conditioner 20C. The other aspects are similar to those of the dispersed generation system 10B according to the third embodiment.

The power conditioner 20C has a constitution where in the control apparatus 2B of the power conditioner 20 according to the third embodiment, the limiter 23 is replaced with the limiter 23A according to the second embodiment, and the voltage drop detection unit 26 is replaced with the voltage drop calculation unit 27 according to the second embodiment and the limit value calculation unit 28 according to the second embodiment. The other aspects are similar to those of the power conditioner 20 according to the third embodiment.

According to the present embodiment, in the power conditioner 20C of the wind power generation system, a function and an effect similar to those of the second embodiment can be obtained.

It is to be noted that in the second embodiment and the fourth embodiment, the limit value Lr is calculated on the basis of the voltage drop ΔV, but the limit value may be selected from previously set limit values. When the limit value corresponding to the voltage drop ΔV is selected, a function and an effect similar to those of the respective embodiments can be obtained.

Moreover, in the third embodiment and the fourth embodiment, the constitution using the wind power generator 11 has been described, but the invention is not limited to this constitution. The generator may be a generator (for example, a hydroelectric power generator) which uses a form of energy other than wind power, as long as the generator generates the AC power.

Furthermore, in the respective embodiments, the limit value and an equation to obtain this limit value may not be based on the above equation (1). For example, the limit value may be obtained by empirical rule or know-how.

Moreover, in the respective embodiments, the interconnection transformer 6 interposed between the dispersed generation system 10 and the AC power system may not be disposed. In this case, the voltage detected by the AC voltage detector 73 is an electricity at the same measuring position as that of the current detected by the AC current detector 71.

It is to be noted that the present invention is not restricted to the foregoing embodiments, and constituent elements can be modified and changed into shapes without departing from the scope of the invention at an embodying stage. Additionally, various inventions can be formed by appropriately combining a plurality of constituent elements disclosed in the foregoing embodiments. For example, several constituent elements may be eliminated from all constituent elements disclosed in the embodiments. Furthermore, constituent elements in the different embodiments may be appropriately combined.

What is claimed is:

1. A power conversion apparatus to be applied to a generation system that interconnects with an alternating current power system, the power conversion apparatus comprising:
    an inverter circuit configured to convert a direct current power into an alternating current power;
    a system voltage measurement unit configured to measure a system voltage of the alternating current power system;
    a voltage drop detector configured to detect a voltage drop of the alternating current power system, based on the system voltage measured by the system voltage measurement unit;
    a direct current power measurement unit configured to measure a direct current power to be input into the inverter circuit;
    an alternating current command value calculator configured to calculate an alternating current command value to control an alternating current output from the inverter circuit, based on the direct current power measured by the direct current power measurement unit and the system voltage measured by the system voltage measurement unit; and
    a current limiter configured to decrease a current limit value to limit the alternating current command value calculated by the alternating current command value calculator and to prevent a ripple of the alternating current output from the inverter circuit from exceeding a setting value of an overcurrent relay provided on an output side of the inverter circuit, when the voltage drop is detected by the voltage drop detector.

2. The power conversion apparatus according to claim 1, wherein the current limiter selects the current limit value which decreases from set current limit values, when the voltage drop is detected by the voltage drop detector.

3. The power conversion apparatus according to claim 1, wherein the current limiter decreases the current limit value in accordance with the voltage drop, when the voltage drop is detected by the voltage drop detector.

4. The power conversion apparatus according to claim 1, further comprising:
    a direct current power source configured to supply the direct current power to the inverter circuit.

5. The power conversion apparatus according to claim 2, further comprising:
    a direct current power source configured to supply the direct current power to the inverter circuit.

6. The power conversion apparatus according to claim 3, further comprising:
    a direct current power source configured to supply the direct current power to the inverter circuit.

7. The power conversion apparatus according to claim 1, further comprising:
    an alternating current power source configured to supply the alternating current power; and
    a converter circuit configured to convert the alternating current power supplied from the alternating current power source into the direct current power, to supply the direct current power to the inverter circuit.

8. The power conversion apparatus according to claim 2, further comprising:
    an alternating current power source configured to supply the alternating current power; and
    a converter circuit configured to convert the alternating current power supplied from the alternating current power source into the direct current power, to supply the direct current power to the inverter circuit.

9. The power conversion apparatus according to claim 3, further comprising:
    an alternating current power source configured to supply the alternating current power; and
    a converter circuit configured to convert the alternating current power supplied from the alternating current power source into the direct current power, to supply the direct current power to the inverter circuit.

10. A control apparatus for a power conversion apparatus that controls the power conversion apparatus to be applied to a generation system which interconnects with an alternating current power system and containing an inverter circuit which converts a direct current power into an alternating current power, the control apparatus comprising:
    a system voltage measurement unit configured to measure a system voltage of the alternating current power system;

a voltage drop detector configured to detect a voltage drop of the alternating current power system, based on the system voltage measured by the system voltage measurement unit;

a direct current power measurement unit configured to measure a direct current power to be input into the inverter circuit;

an alternating current command value calculator configured to calculate an alternating current command value to control an alternating current output from the inverter circuit, based on the direct current power measured by the direct current power measurement unit and the system voltage measured by the system voltage measurement unit; and a current limiter configured to decrease a current limit value to limit the alternating current command value calculated by the alternating current command value calculator and to prevent a ripple of the alternating current output from the inverter circuit from exceeding a setting value of an overcurrent relay provided on an output side of the inverter circuit, when the voltage drop is detected by the voltage drop detector.

11. The control apparatus for the power conversion apparatus according to claim 10, wherein the current limiter selects the current limit value which decreases from set current limit values, when the voltage drop is detected by the voltage drop detector.

12. The control apparatus for the power conversion apparatus according to claim 10, wherein the current limiter decreases the current limit value in accordance with the voltage drop, when the voltage drop is detected by the voltage drop detector.

13. A control method for a power conversion apparatus that controls the power conversion apparatus to be applied to a generation system which interconnects with an alternating current power system and containing an inverter circuit which converts a direct current power into an alternating current power, the control method comprising:

measuring a system voltage of the alternating current power system;

detecting a voltage drop of the alternating current power system, based on the measured system voltage;

calculating an alternating current command value to control an alternating current output from the inverter circuit, based on a power of the direct current power input into the inverter circuit and the measured system voltage; and decreasing a current limit value to limit the calculated alternating current command value and preventing a ripple of the alternating current output from the inverter circuit from exceeding a setting value of an overcurrent relay provided on an output side of the inverter circuit when the voltage drop of the alternating current power system is detected.

14. The control method for the power conversion apparatus according to claim 13, wherein the step of decreasing of the current limit value to limit the calculated alternating current command value includes:

selecting the current limit value smaller than set current limit values, when the voltage drop of the alternating current power system is detected.

15. The control method for the power conversion apparatus according to claim 13, wherein the limitation of the alternating current command value includes decreasing the current limit value in accordance with the voltage drop of the alternating current power system, when the voltage drop of the alternating current power system is detected.

* * * * *